(12) United States Patent
Robell (10) Patent No.: US 10,398,091 B2
(45) Date of Patent: Sep. 3, 2019

(54) METHODS AND MATERIALS FOR PROLONGING PLANT VIABILITY IN REFRIGERATION-FREE STORAGE ENVIRONMENTS

(71) Applicant: Kevin Robell, Kula, HI (US)

(72) Inventor: Kevin Robell, Kula, HI (US)

(73) Assignee: MAUI GREENS, INC., Kula, HI (US)

(*) Notice: Subject to any disclaimer, the term of this patent is extended or adjusted under 35 U.S.C. 154(b) by 0 days.

(21) Appl. No.: 15/948,797

(22) Filed: Apr. 9, 2018

(65) Prior Publication Data

US 2018/0288946 A1    Oct. 11, 2018

Related U.S. Application Data

(60) Provisional application No. 62/483,878, filed on Apr. 10, 2017.

(51) Int. Cl.

| | |
|---|---|
| *A01G 9/02* | (2018.01) |
| *A01G 27/00* | (2006.01) |
| *A01G 27/02* | (2006.01) |
| *A01G 13/02* | (2006.01) |
| *A01G 9/029* | (2018.01) |
| *A01G 24/22* | (2018.01) |
| *A01G 31/02* | (2006.01) |
| *B65D 85/52* | (2006.01) |

(52) U.S. Cl.
CPC ............ *A01G 9/021* (2013.01); *A01G 9/024* (2013.01); *A01G 9/029* (2018.02); *A01G 13/02* (2013.01); *A01G 13/0281* (2013.01); *A01G 24/22* (2018.02); *A01G 27/00* (2013.01); *A01G 27/02* (2013.01); *A01G 31/02* (2013.01); *B65D 85/52* (2013.01)

(58) Field of Classification Search
USPC ........ 47/32, 67, 20.1, 21.1, 29.5, 66.6, 66.7, 47/41.13, 41.15, 79, 59 R, 62 R, 63, 60
See application file for complete search history.

(56) References Cited

U.S. PATENT DOCUMENTS

| | | | |
|---|---|---|---|
| 915,897 A | * | 3/1909 | Skorness |
| 1,243,033 A | * | 10/1917 | Beatty .................... B65D 41/14 215/229 |

(Continued)

FOREIGN PATENT DOCUMENTS

| | | |
|---|---|---|
| GB | 2 313 283 B | 8/1999 |
| KR | 10-0996783 B1 | 11/2010 |
| KR | 20-2016-0001611 U | 5/2016 |

OTHER PUBLICATIONS

Good3studio llc, BIGrootcup, <https://www.kickstarter.com/projects/good3/bigrootcup> [retrieved Jun. 7, 2018], as early as Nov. 29, 2012, 8 pages.

(Continued)

*Primary Examiner* — Andrea M Valenti
(74) *Attorney, Agent, or Firm* — Rowan TELS LLC (57) ABSTRACT

This disclosure relates to compositions, containers, systems, assemblies, and related methods for cultivation and shipping of live and growing plants. The compositions, containers, systems, assemblies, and related methods disclosed herein provide additional stability for a plant's growing environment and enable prolonged storage and shipping shelf life while also reducing or eliminating the need for refrigeration.

25 Claims, 3 Drawing Sheets

(56) References Cited

U.S. PATENT DOCUMENTS

| | | | | |
|---|---|---|---|---|
| 2,017,308 | A | * | 10/1935 | Elmer ................. A01G 13/0281 47/32 |
| 2,064,411 | A | * | 12/1936 | Brandstein ............ A47G 19/26 160/354 |
| 2,948,453 | A | * | 8/1960 | Drown ................. B65D 47/283 215/388 |
| 3,618,260 | A | * | 11/1971 | Convey, Jr. et al. ........................ A01G 27/006 47/32 |
| 3,773,243 | A | * | 11/1973 | Greene ................. A61J 7/0038 220/709 |
| 3,862,614 | A | * | 1/1975 | Kovac .................. B65D 41/22 206/820 |
| 3,891,423 | A | | 6/1975 | Stanley et al. |
| 3,940,884 | A | * | 3/1976 | Mason, Jr. ............. A01G 9/00 47/32 |
| 3,961,443 | A | * | 6/1976 | Insalaco ................ A01G 9/00 206/423 |
| 4,209,092 | A | | 6/1980 | Jones |
| 4,369,598 | A | * | 1/1983 | Beckwith .............. A01G 31/06 220/4.27 |
| 4,403,443 | A | * | 9/1983 | Valente ............... A01G 13/0281 47/32 |
| 4,662,106 | A | * | 5/1987 | Mori ..................... A01G 7/045 47/17 |
| 4,712,329 | A | | 12/1987 | Anderson et al. |
| 4,977,703 | A | | 12/1990 | Blanc |
| 4,995,192 | A | * | 2/1991 | DeWid ............... A01G 13/0237 47/20.1 |
| 5,184,421 | A | * | 2/1993 | Meharg ............... A01G 13/0212 47/21.1 |
| 5,315,783 | A | | 5/1994 | Peng |
| 5,325,627 | A | | 7/1994 | Anderson |
| 5,355,623 | A | | 10/1994 | Brown |
| 5,405,905 | A | * | 4/1995 | Darr ..................... C08K 3/30 524/420 |
| 5,425,204 | A | | 6/1995 | Holmes et al. |
| 5,605,009 | A | * | 2/1997 | Elder ................. A01G 13/0281 47/32 |
| 7,013,597 | B1 | * | 3/2006 | Dominguez ....... A01G 13/0212 47/31.1 |
| 7,617,631 | B2 | | 11/2009 | Conrad et al. |
| 7,647,726 | B2 | * | 1/2010 | Gallo ................. A01G 13/0281 47/21.1 |
| D663,574 | S | * | 7/2012 | Shenkal ..................... D7/392.1 |
| 8,365,465 | B2 | * | 2/2013 | Ogilvie ............. A01G 13/0256 206/423 |
| 8,381,440 | B1 | | 2/2013 | Jabs |
| 8,678,212 | B2 | * | 3/2014 | Kim ....................... B65D 41/22 215/274 |
| 9,003,699 | B2 | | 4/2015 | Ogilvie |
| 9,462,758 | B2 | | 10/2016 | Blaha |
| 9,661,810 | B2 | * | 5/2017 | Walker, II ............. A01G 27/02 |
| 9,848,721 | B2 | * | 12/2017 | Turner .................. B65D 47/06 |
| 2003/0154652 | A1 | * | 8/2003 | Dramm ................. A01G 9/247 47/48.5 |
| 2006/0032133 | A1 | | 2/2006 | Tuoriniemi et al. |
| 2007/0062114 | A1 | | 3/2007 | Kruer |
| 2007/0240363 | A1 | * | 10/2007 | Colletti .............. A01G 13/0281 47/66.6 |
| 2010/0199553 | A1 | | 8/2010 | Felknor |
| 2010/0218421 | A1 | * | 9/2010 | Monnes ............. A01G 13/0212 47/29.5 |
| 2012/0145727 | A1 | * | 6/2012 | Gammage .......... A47G 19/2211 220/709 |
| 2012/0159843 | A1 | * | 6/2012 | Whitcomb ......... A01G 13/0281 47/21.1 |
| 2013/0174484 | A1 | | 7/2013 | Rhoads et al. |
| 2014/0053461 | A1 | * | 2/2014 | Blaha .................... A01G 13/00 47/20.1 |
| 2014/0130407 | A1 | | 5/2014 | Langford et al. |
| 2015/0250117 | A1 | | 9/2015 | Nonomura |
| 2015/0257343 | A1 | | 9/2015 | De Lima et al. |
| 2016/0044879 | A1 | | 2/2016 | Hamlin |
| 2018/0054981 | A1 | * | 3/2018 | Work ................... A01G 13/105 |

OTHER PUBLICATIONS

International Search Report and Written Opinion dated Jun. 22, 2018, issued in corresponding International Application No. PCT/US2018/026728, filed Apr. 9, 2018, 12 pages.

* cited by examiner

METHODS AND MATERIALS FOR PROLONGING PLANT VIABILITY IN REFRIGERATION-FREE STORAGE ENVIRONMENTS

CROSS-REFERENCE TO RELATED APPLICATION

This application claims the benefit of Application No. 62/483,878, filed Apr. 10, 2017, which is expressly incorporated herein by reference in its entirety.

BACKGROUND

There is an expanding market for intact, living plants, including edible plants and their components without extensive pre-processing. However, transporting and distributing healthy, growing plants throughout the marketplace in a cost- and energy-efficient manner continues to be a challenge for producers and suppliers. In some approaches, the plants are initially cultivated in an optimized environment and are subsequently transferred into a container appropriate for the stresses imposed by shipping and distribution to the consumer. In other approaches, seedlings are grown in individual shipping-ready containers at the outset to avoid the need for replanting. However, the containers intended to protect against the relatively harsh conditions imposed by distribution, including temperature fluctuations, lack of consistent water or moisture, physical handling, and the like, do not necessarily provide ideal growing conditions and, thus, result in a deterioration of plant quality. For example, placing lids over growing seedlings to prevent spillage of soil will also reduce or block light entirely. This results in an initial acceleration of growth of the leaf mass in an attempt to locate light, followed by a deterioration of health. Other systems suffer from excessive evaporation, which limits the time available to support plant life before desiccation negatively impacts the plant health, thus limiting the time available to deliver to market. Often, refrigeration is applied during shipping to slow the plant growth and metabolism in an effort to enhance plant longevity and health during storage and transportation. However, such environment control is expensive, contributing significantly to the ultimate plant product in the marketplace.

Accordingly, there remains a need for plant packaging that facilitates ideal cultivation conditions and promotes plant health and longevity during storage and distribution without requiring expensive environmental controls, such as refrigeration. The present disclosure addresses these and related needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This disclosure relates to compositions, containers, systems, assemblies, and related methods for cultivation and shipping of live and growing plants. The compositions, containers, systems, assemblies, and related methods disclosed herein provide additional stability for a plant's growing environment and enable prolonged storage and shipping shelf life while also reducing the need for refrigeration.

In one aspect, the disclosure provides a plant container assembly. The plant container assembly comprises:
a container configured to hold a living plant root mass in a growth medium; and
a pliable cover substantially sealed against the container, wherein the cover comprises at least one hole configured to permit the shoot of a growing plant to pass through and thereafter maintain a substantially sealing contact between the edge of the hole and the stem of the plant such that the cover imposes a moisture barrier between the interior and exterior of the container during a growth phase of the plant.

In one embodiment, the plant container assembly comprises the growth medium disposed in the interior of the container. In one embodiment, the plant container assembly further comprises the plant with the root mass disposed in the container with the growth medium.

In another aspect, the disclosure provides a plant container assembly, comprising:
a container;
a plant seed embedded in a growth medium, wherein the seed and growth medium are disposed in the interior of the container; and
a pliable cover substantially sealed against the opening of the container, wherein the cover comprises a hole configured to permit a plant shoot from the seed to extend through to the side of the cover opposing the growth medium, and wherein the hole is configured to maintain a substantially sealing contact between the hole edge and the protruding stem of the plant during a growth phase of the plant such that the cover separates the root mass from a leaf mass of the growing plant and imposes a moisture barrier between the interior and exterior of the container;
wherein the growth medium contains a thickening agent that reduces respiration rate of the plant.

In another aspect, the disclosure provides a plant container assembly, comprising:
a container;
a living plant with a root mass embedded in a growth medium and a stem and a leaf mass that extend away from the growth medium, wherein the root mass and growth medium are disposed in the container; and
a pliable cover substantially sealed against the container, wherein the cover comprises a hole through which the stem of a growing plant extends, wherein the hole maintains a substantially sealing contact between the hole edge and the stem of the plant such that the cover separates the root mass from the leaf mass and imposes a moisture barrier between the interior and exterior of the container;
wherein the growth medium contains a thickening agent.

In another aspect, the disclosure provides a method for cultivating, storing, and/or transporting a live plant. The method comprises providing a plant container assembly in accordance with the present disclosure, and providing conditions to permit the growth of the plant.

In one embodiment of the method, "providing a plant container" comprises:
placing a plant seed or seedling in a growth medium;
placing the growth medium in the container;
sealing the pliable cover over the opening; and
permitting germination of the plant seed and/or growth of the seedling.

In another embodiment of the method, "providing a plant container" comprises:
placing the growth medium in the container;
sealing the pliable cover over the opening;
inserting a plant seed or seedling in a growth medium through a hole in the pliable cover; and permitting germination of the plant seed and/or growth of the seedling.

In another aspect, the disclosure provides a hanging plant cultivation system. The system comprises at least one plant container assembly of the present disclosure movably suspended from one or more supports by a tether structure. In some embodiments, the hanging plant cultivation system also comprises an irrigation network that comprises channels or pipes to transport water disposed above the at least one suspended plant container assembly with a flexible tube providing fluid communication from the channel or pipes to the interior of the container. The system is configured to provide a controlled rate of water transfer from the channels or pipes to the at least one plant container assembly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

This disclosure relates to packaging configurations, assemblies, and related methods for cultivating plants and which enhance plant health and prolong shelf-life of the living plants during storage and shipping. The disclosure is the result of the inventor's effort to optimize the plant packaging materials in order to reduce costs and energy associated with shipping individual seedlings and live edible plants, which heretofore have utilized refrigeration as a solution to prolong the shelf-life of such living plants. The inventor found that the optimized packing configurations and assemblies described herein significantly reduce or avoid altogether the need for refrigeration, while simultaneously resulting in prolonged shelf-life and optimizing the ultimate health of the plants arriving in the marketplace for final sale.

As described in more detail below, the packaging configuration isolates the living root mass in its growth medium and prevents substantial water loss during storage/shipping. This prolongs the period in which the plant remains hydrated without need for intervention (e.g., watering, etc.). The configurations and methods are useful to preserve the integrity of the root mass and its growth environment during the insults of storage and transportation. The shoot, meanwhile, is permitted to grow away from the isolated growth medium, beyond the container and isolating barrier, to facilitate growth of leaves for photosynthesis. In addition to isolating the root mass and preventing water loss during storage/shipping, for the benefit of keeping the plant hydrated longer, this isolation of the root mass in its growth medium from the shoot, including stem and leaves, also benefits the stem and leaves. First, the barrier that retains moisture in the root mass and growth medium simultaneously reduces humidity within the environment around the leaves of the plant. By reducing humidity around the leaves, the barrier reduces or eliminates conditions that normally would promote incubation of pathogens, such as fungus and bacteria, which can plague leaves. Second, any blockage of light resulting from isolation of the root ball does not affect the leaves, thus permitting continued photosynthesis and promoting the vibrancy of the plant. Third, as the root stem grows into contact with the cover, it provides additional support to protect the integrity of the plant stem during movement. These benefits all work to extend the life and health of the plant during storage/shipping and to optimize the health of the plant upon delivery to the marketplace.

To illustrate, the inventors have surprisingly found that plants cultivated and stored/shipped in the disclosed configurations maintained a healthy (e.g., satisfactorily marketable) state for periods of several days and even up to and including weeks without the need for refrigeration. It was observed that in extreme detrimental conditions, i.e., multiple basil plants in a container at over 100 degrees Fahrenheit and with low humidity, the basil plants contained in the disclosed container assembly still maintained for 6 to 7 days. In more typical environmental conditions, the unattended plants grew and maintained vibrancy for 3 to 6 weeks. In typical distribution scenarios, the plant container assemblies of the present disclosure are contained in a shipping carton from 1 to 5 days after which they are removed. Typical plants will continue to thrive in the container assemblies for an additional 2-5 weeks after removal from the shipping container. Edible plants, e.g., leafy greens, often have a short life span upon growing to salable size. For example, most lettuce plants mature in 40-70 days, depending upon the systems and conditions in which they are grown. Shortly after maturing, the lettuce plants show a strong bias to perish. Upon the slightest stress, a mature lettuce or leafy green variety will tend to "bolt" (go to flower). The disclosed container assembly reduces the likelihood of early bolting and reduces the shock and stresses to the plant, as it remains in the container assembly in which has spent its entire growing cycle. This ultimately extends the life of the living plant product, along with the freshness, nutritional value and desirability for sale.

In accordance with the foregoing, one aspect the present disclosure provides a plant container assembly that comprises a container configured to hold a living plant root mass in a growth medium, and a pliable cover. The pliable cover is substantially sealed against the container, wherein the cover comprises at least one hole configured to permit the shoot of a growing plant to pass through and thereafter maintain a substantially sealing contact between the edge of the hole and the stem of the plant such that the cover imposes a moisture barrier between the interior and exterior of the container during a growth phase of the plant. In some embodiments, the assembly comprises a living plant. In some embodiments, the living plant is a seedling or root mass. In some embodiments, the plant comprises at least a root stem extending through the hole. In some embodiment, the plant comprises a leaf mass on the opposite side of the cover from the root mass.

Container

As used herein, the phrase "configured to hold a living plant root mass in a growth medium" is used to indicate that the container has appropriate dimensions and is made of appropriate materials to secure and hold therein at least one plant root mass with accompanying growth medium in an amount sufficient to maintain the life of the plant for sustained periods of time (in the scale of days, weeks, and even months).

In some embodiments, the plant container, in single modular form, can have an internal volume from about 5 to about 500 cubic inches, from about 5 to about 100 cubic inches, from about 10 to about 75 cubic inches, from about 10 to about 50 cubic inches, and from about 10 to about 25 cubic inches. In some embodiments, the plant container in single modular form has an internal volume of about 5, 7, 10, 15, 20, 25, 30, 35, 40, 50, 75, 100, 150, or 200 cubic inches.

The container is typically rigid or semi-rigid. However, embodiments of softer, more pliable containers (such as, e.g., flexible bags) are also contemplated.

Figure 1:
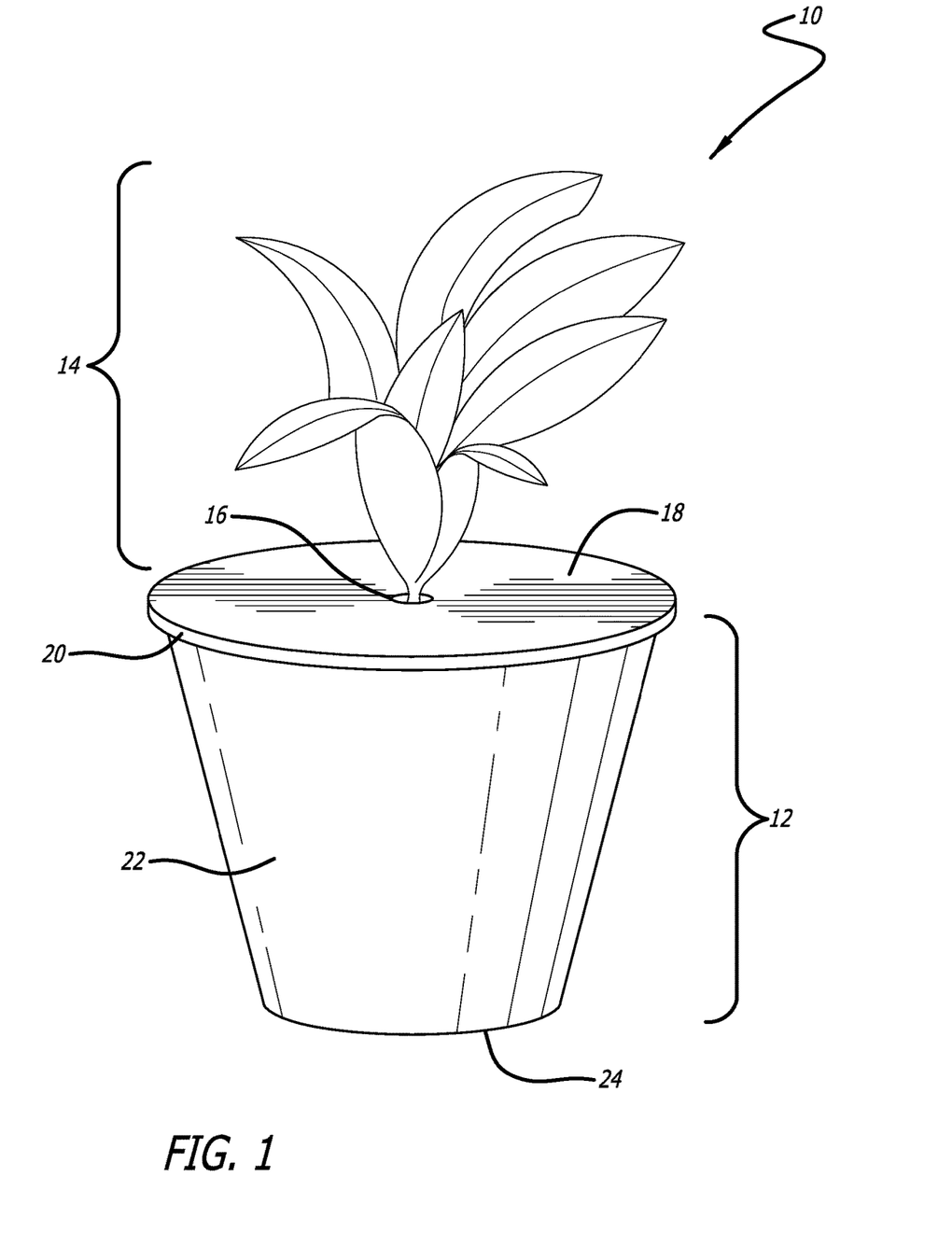
FIG. 1 is a view of one embodiment of a plant container assembly in accordance with the disclosure.

An exemplary container assembly of rigid or semi-rigid design is illustrated in FIG. 1, which provides a side view of the plant container assembly 10. The plant container assembly 10 as illustrated comprises a container 12 with a wall 22 (or walls) and a base 24. A cover is disposed on the container 12 on the side opposite of the base 24. In this embodiment, the cover has an outer rim 20 and an interior hole 16 through which the step of the plant leaf mass 14 extends. The cover 18 separates the leaf mass 14 from the root ball and growth medium that are disposed within the interior of the container 12. The shapes of the base and walls are not limited. For example, in some embodiments, the base 24 is substantially planar so as to provide stability when placed on a flat or level surface. In other embodiments, the container assembly 10 is configured to be suspended and, as such, the base need not be planar, but rather can be curved (e.g., concave or convex). The wall 22 extends from the base 24 toward a top opening. The wall 22 can be straight or curved in the vertical axis. Referred to in the singular sense, it will be understood that the wall can be a singular curved structure when viewed in cross section. However, in some embodiments, the wall 22 structure can comprise a plurality of panels, e.g., planar panels, which are mutually attached at seams and/or folded at angles, such as in a box-type structure. The wall 22 is vertically oriented, but wall 22 axes on opposing sides of the container 12 need not be parallel. Instead, the wall 22 axes can be oriented such that the base is larger than or smaller than the top opening. Accordingly, the top can have a diameter or equivalent cross measurement that is less than, substantially equal to, or greater than the diameter or equivalent cross-measurement of the base. As used herein, the term "diameter" is used to refer to the length of a straight line passing through the cross section of the container shape, or the plane or the top opening or base shape. If the cross section or shape measured is a circle, the diameter passes through the geometrical center. If the cross section is not a circle, the diameter refers to any equivalent cross-measurement that can represent the overall size of the top opening or base shape and can be compared between the top opening and the base to determine their relative sizes.

Figure 2:
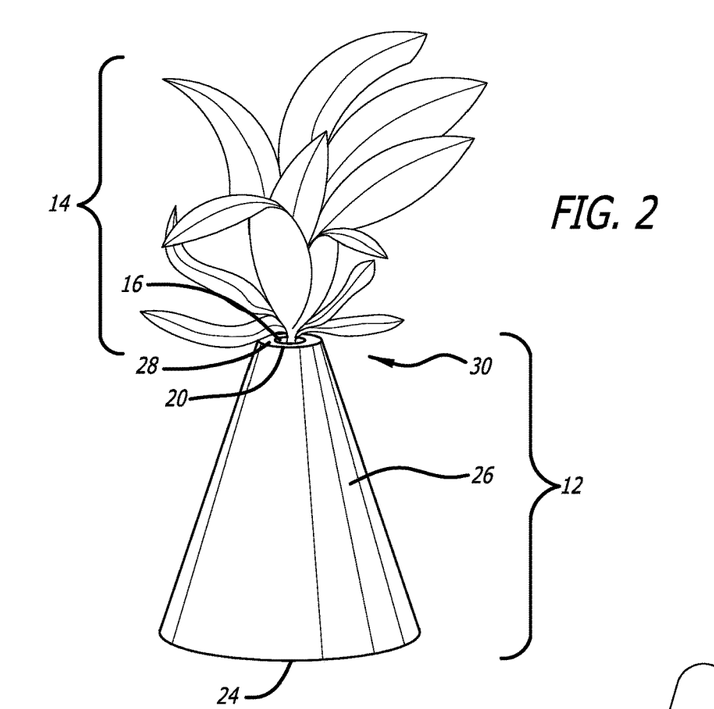
FIG. 2 is a view of another embodiment of a plant container assembly in accordance with the disclosure.

FIG. 2 is a side view of another embodiment of a plant container assembly in accordance with the disclosure. While FIG. 1 illustrates a container with an inverted conical shape, FIG. 2 illustrates a container with a conical shape. Similar to the embodiment of FIG. 1, the container 12 of FIG. 2 has a base 24, a wall 26, and a cover 28. The plant stem and leaf mass 14 extends through a hole 16 in the cover 28 that separates the leaves 14 from the root ball and growth medium in the interior of the container 12. This design addresses the potential need for some plants that have low-hanging leaves that might suffer from excessive density and contact with a wide cover that would otherwise result in reduced air circulation. In the illustrated embodiment, the container 12 is an inverted cone shape with a base 24 that has a greater radius or surface area than the cover 28.

The minimized cover 28 addresses problems associated with some plant types that typically grown low hanging leaf mass with minimized vertical separation from the root mass. To illustrate, when low hanging leaves of some plants, such as lettuce, come into contact with a flat container cover barrier (such as the cover 18 of FIG. 1), the leaves have restricted air flow. Because the leaves are lying on the flat surface of the assembly cover, they cannot breathe and transpire, thus leading to necrosis of the leaf tissue. The conical shape of the container 12 illustrated in FIG. 12 allows a minimized surface area of the cover 28 and provides an open space 30 between the low-hanging leaves of the leaf mass 14 and the angled wall 26 and prevents aggregation of leaves or excessive contact with a barrier or root mass cover. The open space 30 facilitates continued air circulation and avoids moisture build-up on and around the leaves, thus reducing incidence of parasites and/or leaf rot. Furthermore, with increased air circulation, the leaves can transpire, which further prevents necrosis.

In some embodiments, the conical container has a cover 28 with minimized surface area that is disposed (e.g., substantially sealed) over the upper edge of the top opening. The cover 28 is thus a separate component that contacts the container. In this embodiment, the cover 28 comprises a hole 16 in its surface through which the plant stem extends to hold the leaf mass 14 on the opposite side of the cover 28 from the root mass, which is disposed within the container 12. In a specific embodiment, the small opening of the container 12 at the side opposite from the base 24 (referred to as "top opening") can be as small as about ¾ inch across and the cover can be approximately ¾ of an inch (or slightly longer) across and can contact the lip of the top opening.

In alternative embodiments, the wall 26 of the container is conical and the top opening is sufficiently small (e.g., about ¾ inch across) or smaller, depending on the plant, such that no separate cover 28 is required in the assembly. Instead, the constricted opening of the container itself sufficiently reduces air or vapor communication between the interior and exterior of the container 12 when a plant stem is protruding therethrough.

The container can be made of any appropriate material for facilitating storage of a plant and can be readily identified by persons of ordinary skill in the art. The basic requirements include the ability to isolate the root mass and growth medium with a relative moisture barrier. It is also preferred that the container material be able to withstand minor impacts without breaching the barrier provided. Finally, materials are optimally chosen to avoid leaching of chemicals into the growth medium.

In some embodiments, insulating materials are preferred for the container. For example, if known shipping conditions can expose the plants to drastic temperature fluctuations, an insulated container material will buffer the root mass and provide more stable temperature in the growth medium. Thus, it can be desirable if extreme temperature increases can be avoided during the heat of the day, but meanwhile some of that substrate heat is retained into the cool of the night. Furthermore, an insulated material can reduce shock experienced with quick temperature fluctuations to which many plants are susceptible. Slower temperature changes help keep the turgor pressure of the plant steady and maintain nutrient uptake and overall plant health, whereas a rapid temperature change disrupts this pressure and slows or temporarily stays the uptake of the plant and results in poor development and health.

Exemplary, non-limiting materials for the container include appropriate plastics (e.g., polystyrene or polypropylene) and cellulose (with optional waxy water barrier), and the like. Container material can be sourced from plant-based materials to minimize environmental impact due to their biodegradability and renewability. For example, container material can be sourced from soy, corn, potato, soybeans, and the like.

The color of the container can be important to reflect light and further avoid abnormally elevated temperatures in the root mass. Thus, in some embodiments, the container is reflective or substantially reflective. In some embodiments, the container is any shade or variation of white, grey, or other light colors conventionally considered to avoid excessive absorption of light radiation and subsequent conversion to heat. Preferably, any use of colors would include unsaturated colors to optimize the reflective capacity of the container. In an alternative embodiment, containers of any color or material described herein can be further packaged with an outer covering, whether integrated or separated, that has reflective qualities or otherwise avoids excessive light absorption.

The container 12 can be a single formed piece with the wall 26 and base 24 being a single integrated piece. Alternatively, the container 12 can be an assembly of multiple pieces. For example, in the conical embodiments described above and illustrated in FIG. 2, the base 24 can be a separate component from the wall 26. The base 24 is attached to the wall 24 after the root mass and growth medium have been inserted into the container from a bottom opening. The base 24 covers the bottom hole and is sealed to the wall 24. In such embodiments, the base can be of the same or different material as the wall 24 structure. In some embodiments, the base 24 can be the same material as described below for the pliable cover 28, except the base material would not have a substantial hole through which any roots could extend or that would permit substantial loss of moisture.

It will be appreciated that the disclosed container assembly, as described above, can be routinely configured to contain a single plant or a plurality of plants therein. Preferably, when incorporating multiple plants in a single container, the plants will be spatially distributed to promote health and viability of the plants such that the individuals do not compete substantially for space, nutrients, moisture, light, and the like, to each other's detriment.

In one embodiment, the assembly also comprises one or more plants. The plant (or plants) can be a seed, seedling, adolescent or mature plant(s). The seed or root mass of the post-germination plant is disposed in the container with the accompanying growth medium and is isolated from the exterior of the container by the base and walls of the container, and the pliable cover when present.

While the container assembly is described above and illustrated as a single and distinct unit, persons of ordinary skill in the art will readily appreciate that the disclosed container assembly can be repeated and/or serially expanded into an assembly with a plurality of connected containers (e.g., with plants contained therein), such as a tray or rack of one or more rows of containers.

In some embodiments, the container is configured to comprise an inlet to allow periodic or continuous addition of liquid into the container. In some embodiments, the container comprises a valve or inlet to accommodate connection of a tube or other structure to deliver liquid into the interior.

Cover

As indicated above, the container assembly comprises a pliable cover substantially sealed against the container. Typically, the cover is substantially sealed against the top rim of the container. The sealing is typically completed after the growth medium is placed into the interior space of the container. In some embodiments, the sealing is completed without a seed or plant part in the growth medium. The seed or plant part can be inserted later through the hole 16 in the cover 18 or container 12.

The term "substantial sealed" and grammatical variants thereof indicate that contact is maintained between the cover and the container such that it substantially impedes air or vapor communication between the interior and exterior of the container 12 to prevent non-transpiration water loss. In this regard, it is preferred that the majority of all water loss from the interior of the container 12 be the result of plant transpiration (i.e., when the plant has a leaf mass on the exterior of the container) and not from evaporation and airflow between the interior space and the exterior. Use of "substantial" indicates that some evaporation or leaking is permitted, but the escape is slowed to maintain sufficient hydration within the growth medium for a prolonged period of time. The sealing can be implemented according to any appropriate method known in the art, including use of heat sealing (to bond components together), gluing, or use of fasteners, such as clamps, elastic bands, and the like, to maintain a substantial seal.

The pliable cover has at least one cover hole that is sufficiently large to provide ambient light penetration into the interior space of the container such that the shoot extending from a germinating seed will extend upward through the hole. However, the hole should simultaneously be sufficiently small to allow contact with the sides of the stem of the growing plant once it grows through the hole. Thus, the hole is smaller than the crown of the plant being produced when at its mature stage of growth. The contact between the stem and the hole edge provides an additional seal to substantially prevent escape of humidity and, thus, preserve the hydration of the root mass while maintaining a lower humidity for the leaf mass.

The cover is a pliable cover. The term "pliable" is used to indicate that the cover is flexible and can be moved or bent with the application of pressure. Typically, the cover is overlaid on the container in a relatively taut configuration and sealed against the rim of the container, as described above. As the plant shoot/stem penetrates through the hole, the edge of the hole contacts the stem to create a seal by function of the pressure applied by the stem. As the stem grows and expands in diameter, the stem applies additional pressure on the edge of the hole in the cover. Due to the pliability of the cover, the cover yields to the increased pressure applied by the growing stem and the hole expands to accommodate the increased stem width. Preferably, the pliability is such that the seal is maintained while not significantly impeding the growth of the stem.

The nature of the material used for the cover can, in some degree, be determined by a person of ordinary skill in the art considering the specific plant variety of plant produced and stored in the container. The weight and composition of the membrane material must be strong enough to stay adhered to the container and withstand the elements during storage/transport and growth of the plant. However, the cover must still be pliable enough to allow the crown/stem of the plant to stretch and displace it while maturing (as described above). Accordingly, a person of ordinary skill will be able to determine the most appropriate cover for the target application.

Exemplary cover materials include sheets of plastic, foil, and the like. Illustrative, non-limiting examples of cover materials include: polystyrene, polypropylene, foil and metallic materials, plant-based polymers (e.g., sourced from corn, potato, soybeans, and the like). The membrane can be any degree of opacity. In some embodiments, the cover material is capable of receiving print or embossing to accommodate branding or other markings.

In some embodiments, the cover is substantially planar. However, in some embodiments, the cover has some topography configured to permit air to circulate in channels even if a planar leaf is disposed against the cover. For example, pronounced embossing of the membrane material, such as foil, which is capable of holding its embossed pattern, can create channels of airflow by creating separation from a contacting leaf. The channels prevent the decay of leaves that contact the membrane for extended periods of time during the production and distribution process. While the leaves do not require significant ventilation, the air channels prevent leaf suffocation due to lamination of the flat surface of the leaves to the flat surface of a flat membrane. A certain variation of texture of this membrane that created enough separation between the leaves and membrane, even if just a "course" texture, or channeling, will suffice to prevent this suffocation and decay, for extended periods of time.

The number of holes and the size of the holes can vary depending upon the variety of product being produced. In some embodiments, the at least one hole 16 in the cover 18 ranges from about 1/16 inch to about 3/8 inch, depending upon the variety being produced.

The number and spacing of multiple holes also depend upon the variety of the product and the end product desired. Micro greens, edible flowers and nutritional grasses may grow better with a frequency of up to about 30-40 holes per square inch in the cover. In contrast, plants with small leaf mass per seed, such as spinach, may grow better with about 1-5 holes per square inch, such as 1-2 holes per square inch, to achieve the foliage density required. Heading lettuces typically require only one hole in the center of the container, unless a mix or blend of lettuces in a single container is desired.

In some embodiments, the container assembly contains a mix of multiple plant types (e.g., lettuces). For example, in the embodiment with multiple lettuce varieties, about 3-5 holes can be place evenly around the near perimeter of the membrane. The different varieties of lettuce are placed in these holes, resulting in a single container with a mix of living lettuce/greens in a single product. The benefits of this specific embodiment for the producer is that this "mixed" product is produced in a much shorter time frame as the goal is to realize 3-4 petite products, requiring only 20-30 days of growing time as opposed to a single variety of lettuce requiring up to 50 days in the system in order to reach full size. The benefits to the consumer is that one would otherwise have to purchase 3-4 separate products in order to realize this mix, or be confined to purchasing a "cut" mixed product of compromised freshness, longevity, appearance, and nutritional value.

Growth Medium

The composition of the growth medium is determined by the known requirements of the plant or plants being cultivated in the container. For example, different compositions of soils are known for applications in cultivating a wide variety of edible and ornamental plants and can be readily and appropriately chosen by persons of ordinary skill in the art.

The growth medium can also comprise the additions of fertilizers, nutrient additives, mineral supplements, beneficial commensal microorganisms, and the like, to optimize the growth conditions. Additionally, if so desired, the growth medium can also comprise effective amounts of pesticides, selective herbicides, fungicides or other chemicals to remove, reduce, or prevent growth of parasites, weeds, pathogens, or any other detrimental organisms. The formulation of nutrient recipes for the growth medium can be adjusted as appropriate for the variety of the plant produced and shipped. In some embodiments, the nutrient formulation can be modified by augmenting or even reducing specific minerals to optimize and regulate the growth rate of the plant within the packaging, and maintain or enhance the color of the plant. To illustrate, if a basil plant is suddenly placed in a dark environment for an extended period of time, the plant would initially accelerate its growth rate in an attempt to "reach" for and regain the sunlight it no longer receives. This type of rapid growth is problematic for packaged plants because it exhausts the energy and nutrient stores of the plant. Specific mineral recipes can reduce or slow this growth spurt during the storage conditions, thus preserving and promoting long-term vibrancy of the plant. In addition, nutrient formulations can be routinely adjusted to promote keeping color and crispness while plant is packaged and in transport.

Optimized choice and assembly of growth medium can thus be based on various considerations of the plant being cultivated. A brief discussion of considerations is provided.

First, different varieties of plants have different root structures within the container. The size (length and girth) of "mature" roots can occupy a large portion of the "limited" space within the container. This requires the use of an absorbent and expansive material within the substrate to temporarily expand and occupy the substantial volume within the container during germination. When at germination or early in the growth phase, the container volume is preferably filled mostly with substrate in order to support the seed or young plant mass near the top and hole of the membrane. The substrate is also ideally stable, minimized voids or shifting, to ensure that the seed/seedling remains stable and in its position at or near the hole for a sufficient time to allow for germination extension of the stem through the hole and for the roots to penetrate into the substrate. As the roots increase in quantity and size, they must be able to "displace" this originally expanded material and utilize the volume of area that the expandable material was occupying. This allows the roots to fully mature and develop without becoming root bound and compressed too tightly within the container.

Second, nitrogen, phosphorus, and calcium are nutrients that contribute to rapid growth cycles of many plant varieties of interest. Many plant varieties typically require large amounts during their rapid growth cycle. These nutrients cannot be "organically" sourced for use in water-soluble methods of growing and are not compliant with the NOP (National Organic Program) and USDA. This means that "Organic Certification" as a hydroponic facility is not possible. To overcome this limitation, and to facilitate organic certification, calculated amounts of approved "organic" nitrogen, phosphorus and calcium nutrients can be included in the growth medium. However, to avoid problems of "nutrient toxicity", i.e., burning from the intense sources of concentrated fertilizers, while still providing sufficient sources of nitrogen, phosphorus and calcium, the organic sources can be preprocessed prior to incorporation. This preprocessing entails exposure to relevant microbial activity before they are added. The exact quantities of the desired nutrients are calculated for the full growth and expression of the subject plant. The source nutrients are initially provided in compressed, pelleted form. The pellets are introduced to a small colony of beneficial bacteria within this substrate combination. As the microbial activity commences, the colony of bacteria is small and thus processes a small amount of the organic nutrients. As this processing continues, the byproducts of this microbial-driven breakdown are now able to be taken up by the plants roots. As time goes on, the colony of bacteria and microbial activity increases, resulting in more and more nutrients being made available to the plant roots. Because the reproduction of this microbial colony is exponential, so is the processing and availability of the nutrients. This process results in a controlled time release of absorbable forms of the nutrients. This process prevents nutrient toxicity in the beginning stages of the plants' development, and provides amounts of absorbable nutrients commensurate with the growing demand of the growing plant, including in the final trimester of growth when the demands are highest. This process is critically essential to the success of growing fully expressed plants in exceptionally small and sealed containers.

Third, considering that the container is sealed, the only source of additional oxygen to the root system is by way of introducing the water for hydration. Oxygen is contained in or on the surface of the water and is carried to the plant roots. If this oxygen level is NOT sufficient, organically approved oxidizing agents can be added to the substrate to promote further oxygenation in the root zone.

In some embodiments, the growth medium further comprises a thickening agent. The thickening agent creates an effect that is similar to a naturally occurring event in the plant's life. When the end of a growing season is nearing, the plant will experience certain environmental signals that induce the plant to produce latex. The environmental signals are often based on increasing scarcity of resources. For example, the length of day shortens, sunlight intensity reduces, hydration might reduce, or food for the plant is scarce. Latex in a lettuce plant, for example, is thicker than water and very bitter in taste. The plant produces this latex to slow circulation and, thus, slow the perishing process and extend its life long enough for the plant to quickly go to seed and flower for self-preservation of the species. Like natural latex, the thickening agent slows the plant's transpiration rate and, thus, slows the plant's uptake of water from the growth medium during the prolonged period of storage in the container assembly. Furthermore, the metabolism and growth is correspondingly slowed and, thus, conserves nutrients. This effective "rationing" of water maintains the moisture level in the growth medium for a longer period of time and prevents the plant from exhausting the life supporting resources during shipping. This extends resiliency of the plant during storage of and improves the final product in the marketplace.

Exemplary, non-limiting thickening agents include agar and gelatin-based products.

Agar-agar is a vegan based gelatin, made from algae. Agar-agar can be used, depending on the shelf life extension desired, with certain varieties of produce. By mixing this gelatin in water, with a specific ratio, one can manipulate the viscosity of water (with or without nutrients). By increasing the viscosity (slightly thickening the water to a mild gelatin-like substance), the circulation of water throughout the plant slightly coagulates and slows. This slows the uptake of this moisture by the plant. It also slows the transpiration (moisture emitted from leaf surface) of the plant. By doing so, the moisture in the container lasts longer, as the plant is using it more slowly.

While not all varieties require the use of a thickening agent, or agar-agar, it can be included for most plants at various concentrations depending upon the desired shelf life and expected environmental conditions likely to be experienced during distribution and subsequent display. To illustrate, a single lettuce plant and variety in a six-ounce container may contain four-five ounces of hydration. In this example, one-two parts agar-agar to 99-98 parts water (respectively), is beneficial for maintaining long term vibrancy of the lettuce. A person of ordinary skill in the art can further optimize the concentration and water content relative to the growth medium depending on the plant variety and intended use.

Methods

In other aspects, the disclosure provides methods for making and using the plant container assembly disclosed herein.

In one aspect, the disclosure provides a method for cultivating, storing, and/or transporting a live plant. The method comprises providing a plant container assembly, as described above, and providing conditions to permit growth of the plant.

In one embodiment, the method comprises placing a plant seed or seedling in a growth medium; placing the growth medium in the container; sealing the pliable cover over the opening; and permitting germination of the plant seed and/or growth of the seedling, thereby providing the plant container assembly. The pliable cover can have a pre-made hole or the hole can be affirmatively made during the method, before or after sealing over the opening.

In implementation, the seed can be pelleted (e.g., wrapped in an absorbent, clay like material to enlarge the seed for mechanical handling and to help keep the seed moist during germination). The pellets typically include inert forms of clay that encase the seed. The additional nutrients, media, thickening agents, described above, can be added to the pellet appropriately to promote germination and growth.

The conditions to permit growth of the plant include periodic exposure to light, such as sunlight or artificial light. Exemplary artificial lights are familiar in the industry, for example, high intensity LED lights that utilizing red and blue light spectrums. Additional, non-agricultural LED white lights have been implemented with adequate success.

In some embodiments, the container assembly is modified to further comprise an input that facilitates delivery of water and/or nutrients into the growth medium. See e.g., FIG. 3, which illustrates an embodiment of the plant container assembly where the container 12 is configured to receive a pipette 32 or other delivery mechanism to provide additional water 34 and/or nutrients into the growth medium. In the illustrated embodiment, the pipette 32 is inserted into the growth medium through an auxiliary hole 36 in the cover 18.

These embodiments are particularly applicable, for example, for initial germination and culturing en masse prior to processing and storage/shipping, or for prolonged maintenance of the plants after delivery.

Figure 3:
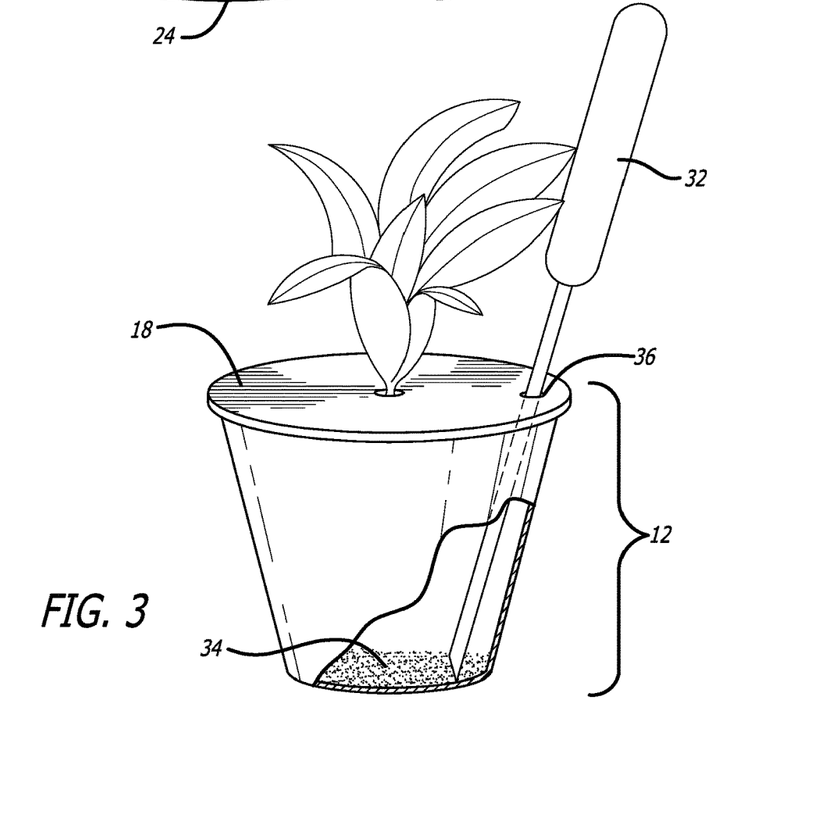
FIG. 3 is a view of another embodiment of a plant container assembly in accordance with the disclosure that is configured to receive input of water and/or nutrients during cultivation and maintenance.

To illustrate, a significant market for individual, live plants is a "Direct-to-Residence" model, where live plants (e.g., edible herbs, lettuce, and the like) are purchased and maintained during consumption. For example, a container assembly containing a lettuce is purchased and consumed gradually at home without ever entirely removing the whole plant from the container. Instead, individual leaves are removed from the stem as needed. To accommodate the diverse demands of purchasers, the container can be scaled up to contain a plurality of living plants (in one or a plurality of connected container assemblies). In the event that the live plants are not consumed quickly, the plants are able to be maintained in the home without repotting or refrigeration. Depending upon the environment in the customer's home, this shelf life can vary greatly. For example, a dry environment with 20% humidity would cause the plant to dehydrate much quicker than in a humid environment. Therefore, the assembly can be accompanied by a delivery device to replenish water and nutrients into the growth medium in the container. Such a delivery device can be a pipette 32, or similar device, to deliver liquids to the growth medium. FIG. 3 illustrates a pipette 36 that penetrates the cover 18 to deliver liquid 34 into the interior space of the container. On first operation, the user would simply fill the pipette much like an eye dropper and pierce the top of the container membrane with the pointed pipette to create an auxiliary hole 36 and insert the stem of the pipette or similar device into the container. Gravity would administer the moisture until the level reached the end of the pipette and would then stop until that water level was reduced and more fluid flowed into the container. This is a very simple and inexpensive process, but would prolong the life of the plant for as long as practically necessary. Alternatively, in some embodiments the container can contain an inlet valve to allow passage of liquids.

In another embodiment, an outer container (e.g., clamshell) is disposed around the container assembly. The outer container is configured to contain a reservoir space at the bottom. With added water, the container assembly, which in this embodiment comprises micro holes in the based and/or wall surface, can absorb water and any nutrients placed in the reservoir via osmosis.

Systems

In another aspect, the container assembly disclosed herein can be readily integrated into existing growing and storage systems.

In some embodiments, the container assembly is configured to be integrated into existing hydroponic systems as are known in the art of cultivation. Hydroponic systems are commonly used worldwide to produce, for example, millions of lettuce and leafy green plants per day. Standard hydroponic systems that specialize in the production of desired plants, e.g., leafy greens, lettuce, herbs, and the like, are typically categorized into two groups: NFT (Nutrient Film Technique) and RAFT. The NFT system and has sloped gutters with water flowing along the bottom. The RAFT system and incorporates large, shallow bodies of water in which large sheets of buoyant material float. In both systems, holes are placed in a series within a holder device. The holes are designed to accept a container in which a seedling has been planted or propagated. The holder maintains the container in contact with the water, thus supplying the seedling with a controlled water and nutrient source. When placed in an NFT system, water containing plant nutrients flows around, under, through, and past the inserted cube, resulting in hydration and promotion of rapid growth of the plant and root structure. These roots rapidly exit the cube and expand to the bottom of the NFT gutter. Similarly, in a RAFT system, instead of the water flowing by the cube such as in an NFT system, the entire cube is suspended in a floating sheet of polystyrene or other material over a body of water. The floating sheet material has several holes on a grid that receive these same plant cubes. The inserted cube is in contact with the water underneath the floating sheet material, which hydrates the cube and promotes plant and root growth.

The sealed container assembly described herein can be made to integrate with such hydroponic systems. Instead, of configuring the seed in a root cube, an appropriately sized container assembly (e.g., about 1¾ in diameter at the base) is inserted into receiving holes of these standard hydroponic systems. The container assembly would comprise a similar substrate in the interior, a cover at the top, and one or more seedlings/germinated seedlings extending from one or more holes in the cover. In this aspect, the container would comprise small sized holes or pores in the base and/or lower walls to permit passage of liquid. When the container is placed in the standard hydroponic system, water would come in contact with the surface of the container base and walls. Similar to osmosis, the water infiltrates the cup walls and delivers hydration and nutrients to the substrate and roots within the cup, promoting rapid plant and root growth. In some embodiments, the size and frequency of the holes, would be limited so as not to allow the roots of the plant to protrude from the container and thus would remain a sealed product, as described herein.

The benefits of incorporating the sealed plant container assembly, as disclosed herein, in place of the hydroponic industry-standard root cube are many:

The roots of the mature plant are undisturbed upon removal from the hydroponic system because, while they are distributed throughout the substrate within the container, they are contained entirely in the container and do not protrude into the surrounding liquid environment.

This plant continues to grow and thrive in the container, despite the container being removed from the hydroponic system. As described above, the container assembly contains adequate nutrients and hydration to withstand distribution and isolated display for many days/weeks, without requiring refrigeration, as described above.

In all hydroponic facilities that grow leafy greens and lettuce, there is a need for human handling at one or more stages of production. Most often, the harvest stage consists of many gloved and masked workers, pulling plants from the system with up to 24-inch roots attached. These roots are typically truncated, and/or wrapped around the root cube and placed in a clamshell produce container or other packaging carton or case. Leaves that have decayed are removed from the underside of the plant and disposed of. In addition to this process being very labor intensive, it is the single greatest risk of contamination. Worker contamination is the greatest cause of foodborne illnesses, such as *e coli, salmonella*, and other illnesses. Furthermore, development of automation and robotics capable of identifying healthy, full sized plants of various shapes, removing those plants from the systems, processing and handling the roots and unsightly leaves, and finally packaging the product to protect from contact can begin to address contamination issues. The disclosed plant container assembly allows for a single, consistent, recurring shape, that can facilitate routine and consistent handling by robotics or mechanical devices. In addition, there are no leaves or roots to handle or process, thus simplifying the automated process.

Accordingly, the present disclosure provides hydroponic systems and methods that incorporate the disclosed plant container assembly in place of the standard root cube.

To facilitate this integration, in some embodiments, the disclosed container comprises one or more micro holes that permit fluid communication when the container is immersed in water but still prevent plant roots from substantially penetrating from the interior. The one or more holes can be disposed in the base and/or wall structure, for example the lower region of the wall structure. It will be appreciated by persons of ordinary skill in the art that depending upon the variety of plant being produced, the roots vary in size, length, quantity and aggressiveness. A less aggressive root structure of a single plant that requires high levels of hydration and nutrients would require a larger quantity of larger holes, such as about holes with 30-50 micron diameters, placed on the surface area of the container, in a frequency of up to 100 per square inch. A plant that has a more aggressive root structure would require a greater volume of smaller holes such as 200 per square inch, 5-30 micron holes. These holes allow the water in such traditional hydroponic systems to enter the container assemblies to feed and hydrate the plant. When used in such hydroponic systems, the container assemblies are ready for storage and shipping when the plant has grown sufficiently for market. Instead of removing the plant from its growth environment, the container itself is removed and is ready for shipping without further processing required, thus reducing human interaction with the plant when "harvesting" the plants for distribution.

Figure 4:
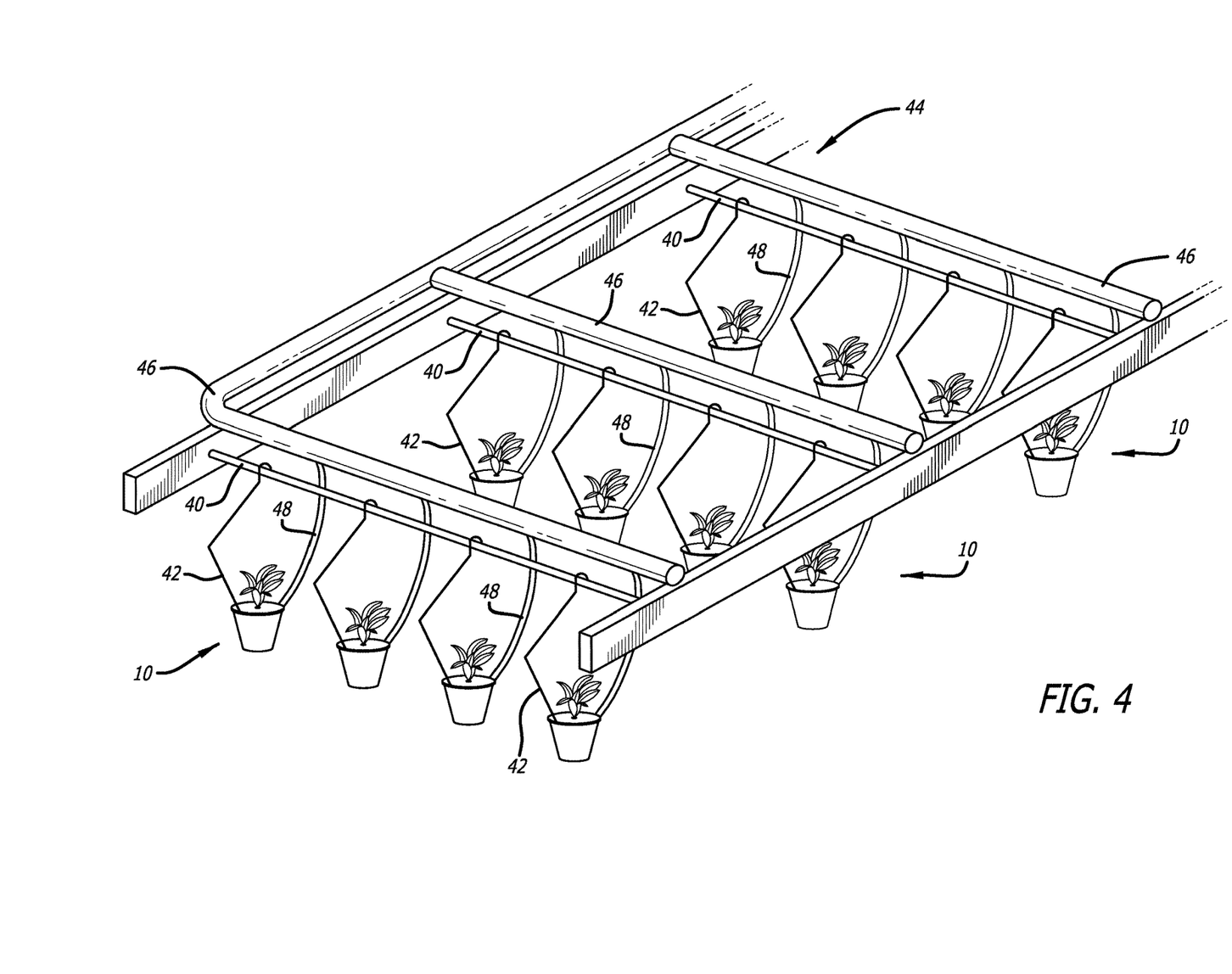
FIG. 4 illustrates an exemplary embodiment of a hanging cultivation system that integrates the plant container assembly in accordance with the present disclosure.

In another aspect, the plant container assembly can be integrated into other modular growth systems, facilitating growth, processing, and shipping without excessive handling or repotting. In this regard, one advantage of the disclosed assembly is that the containers can be readily incorporated into a modular growth system. In one embodiment, the disclosed containers can be readily integrated into an expandable and adjustable system for cultivating plants in discrete containers. FIG. 4 illustrates an exemplary embodiment of a hanging cultivation system that integrates the plant container assembly in accordance with the present disclosure. The illustrated embodiment of the hanging cultivation system comprises at least one container assembly 10 suspended from structural support 40 located above the assembly 10 by a tether 42. A flexible irrigation network 44 can be integrated to sustain prolonged cultivation conditions. The irrigation network 44 can comprise one or more pipes 46 that transmit water and optionally liquid nutrients throughout the area of the hanging cultivation system. Flexible tubes 48 connect the pipes to the container one or more assemblies 10 to deliver the water and optional liquid nutrients to the individual plants. When the pipes 46 are disposed above the at least one container assembly 10, the water delivery can be gravity-driven, such as at a controlled drip rate. The rate can be controlled and optimized by techniques known in the art during the cultivation process, while minimizing waste through spillage or evaporation. For example, the rate of water flow can be affected by the diameter of the tubes, valves, and the amount of water circulating through the pipes.

The tether 42 can be any hanging device of sufficient strength and integrity to support the weight of the plant container assembly. The tether can be flexible or rigid. The tether can be configured for easy attachment and detachment from the support structure 40. Illustrative materials for the tether are cord, rope, chain, belt, wire, and the like. Typically, the tether is configured such that the sealed plant container assembly 10 hangs from the support 40 via the tether 42 with a sort of gimbal action with the plant container assembly 10 acting as the ballast. In the embodiment illustrated in FIG. 4, the tether 42 is rigid wire with a hook that attaches over support 40. The rigid wire is bent at an angle to allow space for growth of the plant leaf mass. The wire attaches to the container assembly 10 near or at its rim. The design of the attachment can be implemented by persons of ordinary skill depending on the design of the container assembly. In some embodiments, the tether, such as a rigid wire, has a circular end in a plane horizontal to the ground. The circle is at a fixed circumference that is slightly less than the maximum circumference of the container, where the container generally has an inverted conical shape. In other embodiments, the container has a lip extending beyond the wall and is larger than the circle at the end of the tether. In such embodiments, the container assemblies can be attached to the tether by simply placing the container in the rigid circle from above. In more general embodiments, the container assembly is further configured to comprise hooks or loops to which a tether (whether rigid or flexible) can attach.

In the hanging cultivation system, as opposed to setting the disclosed containers on the ground or over a bottom support, the suspension system allows the plant container assemblies to withstand winds or other physical disruptions by stably swinging without toppling over. Any integrated irrigation network 44 includes flexible tubes that sway with any movement of the plant containers.

This configuration allows for optimized air circulation and light exposure around the growing plants. These benefits are realized, in part, because the system is modular and individual plants can be easily manipulated with minimal disruption. The illustrated set-up allows for easy, flexible plant spacing. In preliminary stages, while the seeds are initially germinating in their respective container assemblies, the plurality of assemblies can be installed at a high density. As the plants mature and require more area to accommodate the growing leaf masses, the container assemblies can be easily spread out and avoid contact between the individual plants. To illustrate by contrast, most current hydroponic facilities start plants in trays at approximately two-inch spacing to enhance density and save space. However, as the plants grow and the leaf masses expand, the plants must continually be dispersed further apart to allow the growing plants sufficient air space to grow and mature. Thus, after approximately ten days (depending on the plant), the trays are separated into individual substrate cubes and placed in the growing system at 4-inch spacing for another approximately ten-day period. The plants are once again moved to a part of the system that has 6-inch spacing or larger. This system incurs a significant labor cost to implement the spacing. Furthermore, these traditional processes of growing potted plants require benches and specifically-sized trays to hold and stabilize the plants and are very costly over large facilities. The trays must be interchanged to adjust the plant spacing as they mature. In contrast, the disclosed approach permits easy adjustment of the hanging container assemblies as additional space is needed. This is implemented simply by sliding the plant along the cable or support system. Additionally, the suspension height can be adjusted variably to permit plants to grow at slightly different elevations, thus further separating the plants without requiring additional set-up space. This can be implemented by raising or lowering neighboring support 40 structures and/or lengthening or shortening the relative lengths of the neighboring tethers 42.

It is generally noted that the use of the term "or" in the claims is used to mean "and/or" unless explicitly indicated to refer to alternatives only or the alternatives are mutually exclusive, although the disclosure supports a definition that refers to only alternatives and "and/or."

Following long-standing patent law, the words "a" and "an," when used in conjunction with the word "comprising" in the claims or specification, denotes one or more, unless specifically noted.

Unless the context clearly requires otherwise, throughout the description and the claims, the words "comprise," "comprising," and the like are to be construed in an inclusive sense as opposed to an exclusive or exhaustive sense, such as in the sense of "including, but not limited to." Words using the singular or plural number also include the plural and singular number, respectively. Additionally, the words "herein," "above," and "below," and words of similar import, when used in this application, shall refer to this application as a whole and not to any particular portions of the application. Words such as "about" and "approximately" imply minor variation around (above or below) the stated value, usually within a standard margin of error. In some embodiments, the minor variation falls within 10%, 9%, 8%, 7%, 6%, 5%, 4%, 3%, 2%, or 1% of the stated value.

Disclosed are materials, compositions, devices, and components that can be used for, in conjunction with, and in preparation for methods, assemblies, and components also disclosed herein. It is understood that when combinations, subsets, interactions, components, etc., of these materials are disclosed, each of various individual and collective combinations is specifically contemplated, even though specific reference to each and every single combination and permutation of these compounds may not be explicitly disclosed. This concept applies to all aspects of this disclosure including, but not limited to, steps in the described methods, and components of the described systems and assemblies. Thus, specific elements of any foregoing embodiments can be combined or substituted for elements in other embodiments. For example, if there is a variety of additional steps that can be performed, it is understood that each of these additional steps can be performed with any specific method step or combination of method steps of the disclosed methods, and that each such combination or subset of combinations is specifically contemplated and should be considered disclosed. Additionally, it is understood that the embodiments described herein can be implemented using any suitable material such as those described elsewhere herein or as known in the art.

While illustrative embodiments have been illustrated and described, it will be appreciated that various changes can be made therein without departing from the spirit and scope of the invention.

The embodiments of the invention in which an exclusive property or privilege is claimed are defined as follows:

1. A plant container assembly, comprising:
    a container having a rim around an opening to an interior;
    a plant seed or living plant root mass disposed in a growth medium located within the interior;
    a pliable cover sealingly coupled around the complete circumference of the rim, wherein the pliable cover retains substantially all contents of the container when the container is inverted; and
    a plant stem aperture extending through the pliable cover, the plant stem aperture being smaller than an expected crown of the plant at its mature stage of growth and having a continuous arcuate edge completely surrounding a shoot, the plant stem aperture configured to permit the shoot from the plant seed or the living plant root mass growing in the container to pass through the pliable cover and to permit a stem of the shoot to contact the continuous arcuate edge,
    wherein the pliable cover is configured to allow the plant stem aperture to increase in diameter as a result of radially outward pressure exerted on the continuous arcuate edge by the stem increasing in cross-section during a growth phase of the shoot, and to maintain a substantially sealing contact between the continuous arcuate edge of the plant stem aperture and the stem, such that the cover creates a moisture barrier across the opening between the interior and an exterior of the container during the growth phase of the shoot.

2. The assembly of claim 1, wherein the container is rigid or semi-rigid.

3. The assembly of claim 1, wherein the container comprises an insulating material.

4. The assembly of claim 1, wherein the container is made of plastic, cellulose, or polystyrene foam.

5. The assembly of claim 1, wherein the container comprises a base, vertically oriented walls, and the rim.

6. The assembly of claim 5, wherein a diameter defined by the container base is less than a diameter defined by the top rim, a diameter defined by the container base is greater than a diameter defined by the top rim, or a diameter defined by the container base is substantially similar to a diameter defined by the top rim.

7. The assembly of claim 1, wherein the container comprises one or more micro holes in the base or a lower region of the walls configured to permit fluid communication from the exterior to the interior when the container is immersed in water but to prevent plant roots from penetrating from the interior to the exterior.

8. The assembly of claim 1, wherein the plant stem aperture is sufficiently large to provide ambient light penetration such that the shoot extending from a germinating seed will extend upward through the plant stem aperture, but simultaneously is sufficiently small to allow contact with the stem of the shoot during the growth phase.

9. The assembly of claim 1, wherein the cover is sufficiently pliable such that the plant stem aperture does not substantially impede growth of the shoot.

10. The assembly of claim 1, wherein the cover comprises foil or plastic.

11. The assembly of claim 1, wherein the growth medium comprises a thickening agent that reduces the transpiration rate of the plant seed or the living plant root mass.

12. The assembly of claim 11, wherein the thickening agent is gelatin or agar.

13. The assembly of claim 1, wherein the assembly is configured to receive a delivery of liquid through the container or pliable cover.

14. The assembly of claim 13, further comprising a liquid delivery device.

15. A plant container assembly for a plant, comprising:
    a container having a rim around an opening to an interior;
    a plant seed or living plant root mass embedded in a growth medium, wherein the seed and growth medium are disposed in the interior;
    a pliable cover sealingly coupled around the complete circumference of the rim, wherein the pliable cover retains substantially all contents of the container when the container is inverted; and
    a plant stem aperture extending through the pliable cover, the plant stem aperture being smaller than an expected crown of the plant at its mature stage of growth, and having a continuous arcuate edge completely surrounding a shoot, the plant stem aperture configured to permit the shoot from the plant seed or the living plant root mass growing in the container to pass through the pliable cover and to permit a stem of the shoot to contact the continuous arcuate edge,
    wherein the plant stem aperture is sufficiently large to provide ambient light penetration such that the shoot extending from a germinating seed will extend upward through the plant stem aperture, but simultaneously is sufficiently small to allow contact with the stem of the shoot during the growth phase, wherein the cover is sufficiently pliable such that the plant stem aperture does not substantially impede growth of the shoot, wherein the pliable cover is configured to allow the plant stem aperture to increase in diameter as a result of radially outward pressure exerted on the continuous arcuate edge by the stem increasing in cross-section during a growth phase of the shoot, and to maintain a substantially sealing contact between the continuous arcuate edge of the plant stem aperture and the stem, such that the pliable cover separates a root mass from a leaf mass of the growing plant, and wherein the growth medium contains a thickening agent that reduces respiration rate of the plant.

16. A plant container assembly, comprising:

a container having a rim around an opening to an interior;

a living plant with a root mass embedded in a growth medium and a stem and a leaf mass that extend away from the growth medium, wherein the root mass and growth medium are disposed in the interior;

a pliable cover sealingly coupled around the complete circumference of the rim; and a plant stem aperture extending through the pliable cover, the plant stem aperture being smaller than an expected crown of the plant at its mature stage of growth and having a continuous arcuate edge completely surrounding the stem, the plant stem aperture configured to permit a stem to contact the continuous arcuate edge, wherein the plant stem aperture is sufficiently large to provide ambient light penetration such that the shoot extending from a germinating seed will extend upward through the plant stem aperture, but simultaneously is sufficiently small to allow contact with the stem of the shoot during the growth phase, wherein the cover is sufficiently pliable such that the plant stem aperture does not substantially impede growth of the shoot, wherein the pliable cover is configured to allow the plant stem aperture to increase in diameter as a result of radially outward pressure exerted on the continuous arcuate edge by the stem increasing in cross-section during a growth phase of the plant, and to maintain a substantially sealing contact between the continuous arcuate edge of the plant stem aperture and the stem of the plant such that the cover separates the root mass from the leaf mass and creates a moisture barrier between the interior and an exterior of the container, and wherein the growth medium contains a thickening agent.

17. A method for cultivating, storing, and/or transporting a live plant, comprising:

providing a plant container assembly as recited in claim 1, and providing conditions to permit the growth of the plant.

18. The method of claim 17, wherein providing the plant container assembly comprises:

placing the plant seed or the living plant root mass in the growth medium;

placing the growth medium in the container;

sealing the pliable cover over the opening; and permitting germination of the plant seed and/or growth of the living plant root mass.

19. The method of claim 17, wherein providing the plant container assembly comprises:

placing the growth medium in the container;

sealing the pliable cover over the opening;

inserting the plant seed or the living plant root mass in a growth medium through the plant stem aperture in the pliable cover; and permitting germination of the plant seed and/or growth of the living plant root mass.

20. The method of claim 17, further comprising forming the plant stem aperture in the pliable cover.

21. The method of claim 17, wherein the plant container assembly comprises at least one micro-hole in the base or vertically oriented walls of the container, and the method further comprises placing the plant container assembly in a hydroponic system to facilitate transfer of water to the interior of the container.

22. The method of claim 17, wherein the plant container assembly is suspended and provided with regular drip irrigation to permit the growth of the plant.

23. The method of claim 17, wherein the conditions to permit growth do not require refrigeration for long-term viability of the plant.

24. A hanging plant cultivation system, comprising at least one plant container assembly as recited in claim 1 movably suspended from one or more supports by a tether structure.

25. The hanging plant cultivation system of claim 24, further comprising an irrigation network, wherein the irrigation network comprises:

one or more channels or pipes configured to transport water disposed above the at least one suspended plant container assembly; and one or more flexible tubes providing fluid communication from the channels or pipes to the interior of the container configured to provide controlled rate of water transfer from the channels or pipes to the at least one plant container assembly.

* * * * *